United States Patent [19]
Kaufman, Sr.

[11] 3,810,286
[45] May 14, 1974

[54] METHODS FOR MANUFACTURING HOLLOW MEMBERS

[75] Inventor: Ralph O. Kaufman, Sr., Titusville, Pa.

[73] Assignee: Cyclops, Corporation, Universal-Cyclops Specialty Steel Division, Pittsburgh, Pa.

[22] Filed: Apr. 26, 1971

[21] Appl. No.: 137,366

Related U.S. Application Data

[60] Division of Ser. No. 864,927, Sept. 10, 1969, Pat. No. 3,606,580, which is a continuation-in-part of Ser. No. 823,924, May 12, 1969.

[52] U.S. Cl. ...... 29/156.8 H, 29/156.8 B, 29/155 C, 29/DIG. 32, 113/116 F, 416/213, 416/233
[51] Int. Cl. .......................................... B23p 15/02
[58] Field of Search ................ 416/232, 233, 213; 29/156.8 H, 156.8 B, 155 C, 155 R, DIG. 32; 113/116 F

[56] References Cited
UNITED STATES PATENTS

| | | |
|---|---|---|
| 994,166 | 6/1911 | Kienast ........................ 29/156.8 H |
| 665,600 | 1/1901 | Geisenhoner ................. 29/156.8 B |
| 2,093,208 | 9/1937 | Nolte ............................... 29/155 C |
| 3,627,443 | 12/1971 | Pirzer ...................................... 416/90 |

Primary Examiner—Charles W. Lanham
Assistant Examiner—D. C. Reiley, III
Attorney, Agent, or Firm—Webb, Burden, Robinson & Webb

[57] ABSTRACT

The method of constructing hollow members includes precision rolling wrought metal to form elongated shapes having a specially formed edge configuration and a plain formed remaining portion. The shapes are blanked into components before or after forming, where necessary, and the components are positioned so that the plain formed remaining portion of one component cooperates with and is ultimately joined with the specially formed edge configuration of another component.

7 Claims, 8 Drawing Figures

INVENTOR.
Ralph O. Kaufman, Sr.
BY
Webb Burden Robinson & Webb
HIS ATTORNEYS 3,810,286

METHODS FOR MANUFACTURING HOLLOW MEMBERS

This application is a division of my application Ser. No. 864,927, filed Sept. 10, 1969, now U.S. Pat. No. 3,606,580 which, in turn, is a continuation-in-part of application Ser. No. 823,924, filed May 12, 1969.

This invention relates to a method of manufacturing members which are hollow and, more particularly, to hollow airfoil members and hollow structural supports.

Specially shaped parts are required for many applications, and the weight and the chemical and physical property requirements thereof vary with the intended application. To meet these various requirements, many manufacturing methods have been employed either singly or in combination incorporating both solid sections and solid or joined hollow sections. These manufacturing methods used heretofore include, but are not limited to, forging, casting, cold drawing, extruding, cold rolling and machining.

My invention, by providing a hollow member, results in a lighter product as compared to a similar solid product of identical configuration and of the same metal. This, in turn, presents greater freedom in material selection and in substitution of materials since the metal need only be capable of being worked, i.e., a wrought metal. My invention further provides for high volume production because of the ease in making the several requisite components of the hollow member. My invention also is readily adapted to producing tapered members. My invention further provides a well balanced and efficiently operating airfoil member by having a section of increased weight present both at the leading and trailing edges. My invention provides further advantages in strength and design since the joining of the members, whether by welding or other means, occurs in an area spaced inwardly from the extreme ends of the members and in an enlarged mass area. A particular advantage of my invention is the ability to produce the required configurations in long bars or strips. These long lengths may then be cut or blanked to the exact length required for the particular member, thus further increasing the high productivity of these members.

My invention is a method of manufacturing the hollow member which includes precision rolling wrought metal into elongated shapes having a specially formed edge configuration which includes an enlarged mass and a recess therein and a plain formed remaining portion. The shapes are then blanked into components and the components are positioned so that a plain formed end configuration of one component cooperates and is ultimately joined to the specially formed edge configuration of another component. The cooperation of the components takes place along the recess of the enlarged mass and the cooperation is direct and continuous.

In the accompanying drawings, I have shown various hollow members manufactured in accordance with my invention and in which.

Since the product resulting from my invention contains formed components, the metals employed must be workable and they are hereafter referred to as wrought metals. Initially the wrought metal, generally in the form of bars or strips, is formed into a long shape having a specially formed edge configuration and a plain formed remaining portion. The specially formed edge configuration includes an enlarged mass area having a recess therein. This forming is preferably done by precision rolling since this forming technique is most amenable to producing the desired configurations in an efficient and economical manner. It is conceivable that other techniques, e.g., extrusion could be employed, but since precision rolling is preferable, it will be used hereinafter to include the improbable but possible other means of forming.

After precision rolling the wrought metal into the elongated shape of the desired configuration, the shape is blanked into components. Because many applications require complex curvatures or straight angular bends, the shapes may be additionally formed before or after being blanked into components. Where additional forming is necessary, the components are formed by well known techniques to the desired shape and the particular techniques employed do not form a part of this invention.

The components are then positioned so that the plain formed end configuration of one component cooperates with the recess in the enlarged mass area of the specially formed edge configuration of another component. This cooperation of the components is inward of the extreme end of the specially formed edge configuration and is direct and continuous so as not to interrupt the continuity of the final hollow member. As will be shown, more than two components can be joined to form multi-component systems in accordance with my invention. After the components are positioned, they are joined permanently to form the hollow member, such as by welding or brazing. By only employing components having a specially formed end configuration and a plain formed remaining portion and positioning these components in accordance with my invention, adjacent connections will be on opposing sides of the member and this further increases strength and resistance to failure.

The various shapes which can be manufactured in accordance with my method are numerous.

Figure 1:
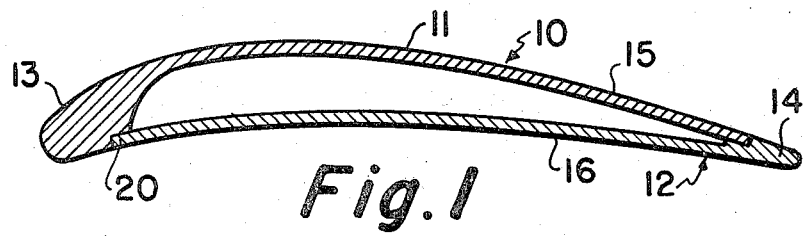
FIG. 1 is a section through a hollow airfoil member.

In FIG. 1 I have illustrated an airfoil member 10 made in accordance with my method of manufacture. Airfoil member 10 is hollow and is comprised of two connected components, namely, upper component 11 and lower component 12. Each component 11 and 12 has a specially formed edge configuration 13 and 14, respectively, and a plain formed remaining portion 15 and 16, respectively. The specially formed edge configuration is shaped so that a small recess 20 is present inward of the extreme end to mate with the end of the plain formed remaining portion of the second component. These particular configurations of each component were accomplished by precision rolling bars or strips into shapes and then blanking and forming the components. The two components are positioned so that the specially formed edge configuration 13 of component 11 is joined to the plain formed remaining portion 16 of component 12 and the plain formed portion 15 of component 11 is joined to the specially formed edge configuration 14 of component 12. The components 11 and 12 are then joined by brazing, welding or other connecting techniques. This then balances the weight distribution and the airfoil member 10 by having a heavier section positioned at both the leading and trailing ends of the airfoil member 10.

Figure 2:
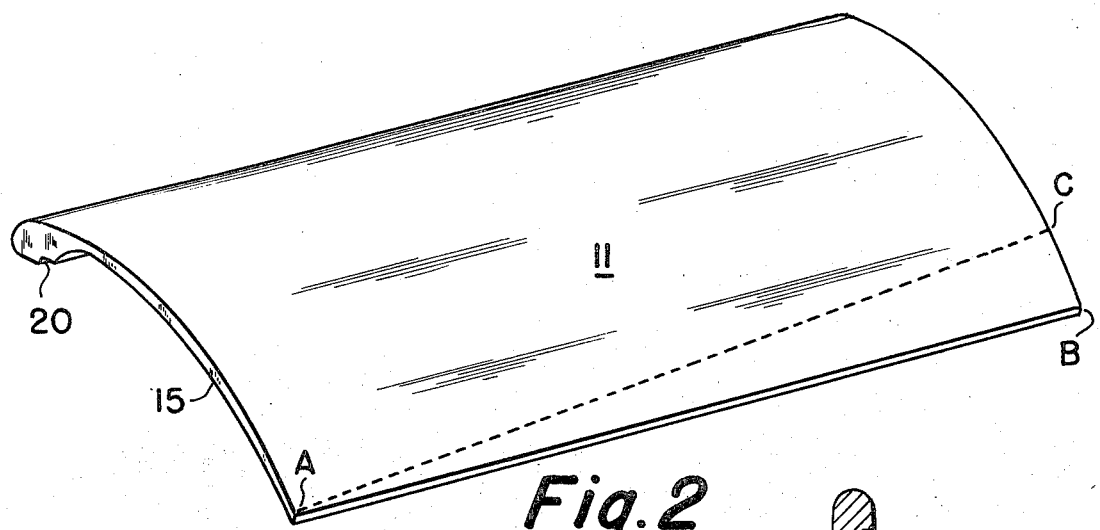
FIG. 2 is an isometric view of the upper component of an airfoil section.
Figure 3:
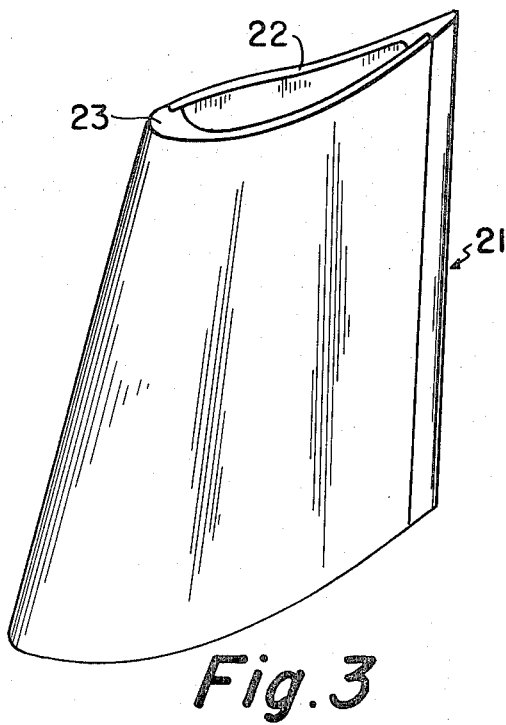
FIG. 3 is an isometric view of a tapered airfoil member.

The member, according to my invention, may also be tapered as illustrated by a tapered airfoil member in FIG. 3. To arrive at this taper, the individual upper and lower components 22 and 23 are blanked at an angle to a somewhat trapezoidal shape prior to connecting. For example, the blank of component 11, shown in FIG. 2, is prepared for a tapered airfoil member 21 by removing, by cutting or blanking the triangular section designated by sides A–B, A–C, C–B or triangle A–B–C in FIG. 2. Then by doing the same for the second component and joining the remaining somewhat trapezoidally shaped blanks, as described hereinbefore, a hollow tapered airfoil member 21 is formed. It should be noted that the portion of the wrought metal removed from a tapered blank is relatively small compared to the entire amount, thereby maintaining an appreciable yield and efficiency advantage over tapered airfoil members formed by other techniques, for example, forging and machining a solid blank.

Figure 4:
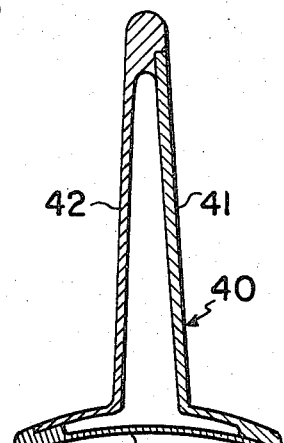
FIG. 4 is a section through a three component hollow airfoil.
Figure 5:
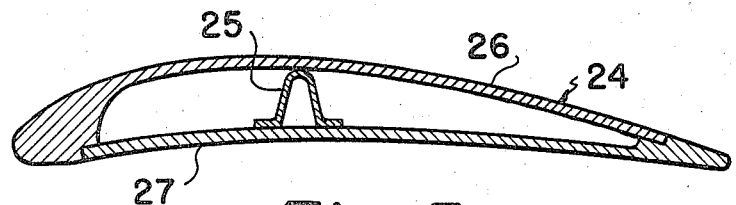
FIG. 5 is a section through a hollow airfoil member having an internal supporting rib.

A plurality of components shaped and connected in a manner described hereinbefore, can be employed to construct various hollow members. I have illustrated in FIG. 4 a hollow missile fin 40 comprised of three components 41, 42 and 43. Each component, as in the earlier embodiments, has a specially formed edge configuration including an enlarged mass area and a recess therein and a plain formed remaining portion. These components are blanked as described in the earlier described embodiments to form a tapered fin. Each component is connected so that a plain formed portion of one component is mated and connected to a specially formed edge configuration of another component along the recess of the enlarged mass area. However, in this embodiment, two of the components 41 and 42 contain oppositely directed right angle bends so that a fin is formed having a web and a base section.

Where size, strength or material requirements are such that a hollow member, such as an airfoil, will not meet the requirements of a particular application, a mid chord supporting rib such as that illustrated in FIG. 5 can be inserted in the hollow portion of the airfoil section to give additional support. Airfoil member 24 is formed in the same way as the earlier embodiments having an upper component 26 and a lower connected component 27 connected in the same manner as the above-described embodiments. A supporting rib 25 is positioned in the hollow portion of the airfoil section between the airfoil section ends and is secured to both the upper and lower components by a means compatible with the particular materials employed.

Figure 6:
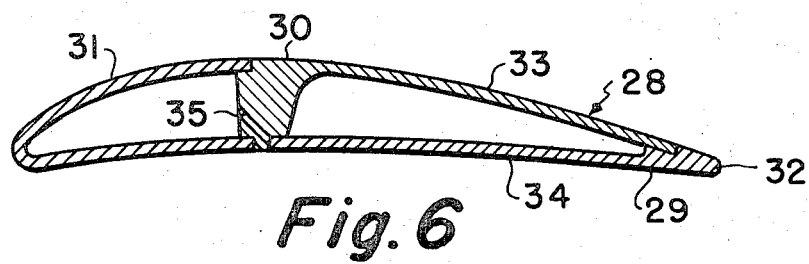
FIG. 6 is a section through a hollow airfoil member having an integral supporting rib.

The rib can also be made an integral part of the components of the hollow member as illustrated in FIG. 6. Hollow member 28 comprises three components 29, 30 and 31. Component 29 has a specially formed edge configuration 32 which mates with the plain formed portion 33 of component 30. In turn, the plain formed portion 34 of component 29 mates with the specially formed edge configuration 35 of components 30. In this case, edge configuration 35 actually constitutes the integral supporting rib when the airfoil member is completely formed. Component 31 which has two plain formed ends is also connected to specially formed edge configuration 35. The result is that an internally supported airfoil member 30 is formed whereby two of three components are formed by connecting plain formed portions to specially formed edge configurations and the third component which is completely plainly formed is shaped to mate with the specially formed edge configuration of the component forming the integral supporting rib.

Figure 7:
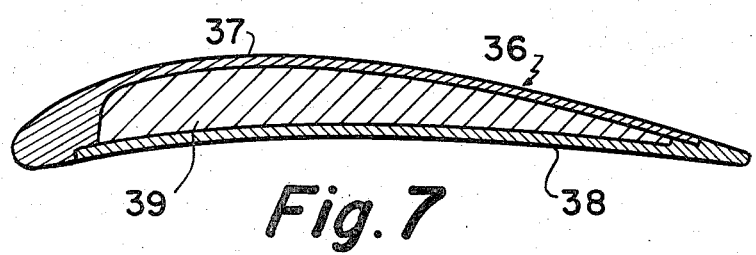
FIG. 7 is a section through an airfoil member containing a filler in the airfoil's hollow section.

The hollow member may also encapsulate a filler material different from the wrought metal and which fills the hollow portion of the member, as shown in FIG. 7. Airfoil member 36 comprises an upper component 37 and a lower component 38 which are shaped and connected as in the earlier described embodiments. The cavity area of the airfoil member 36 is filled with a matrix of filler material 39. This filler material 39 may be a material of lesser density than the wrought metal components to enhance the strength without materially adding to the weight or it may be a highly heat transmitting substance to rapidly remove heat from the outer components. Again, the particular application will dictate the material requirements of the filler material.

Figure 8:
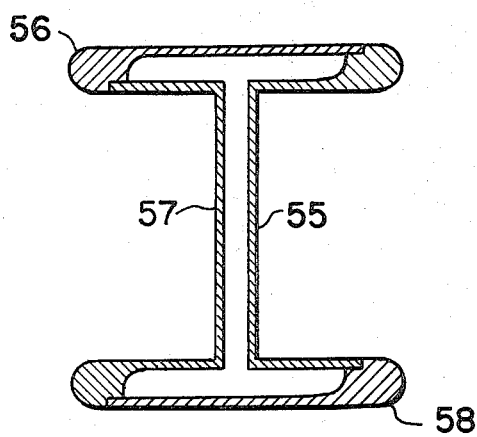
FIG. 8 is a section through a structural I-shaped hollow support member.

My method of constructing hollow members is equally applicable to structural supports. A four component structural I-shaped support is illustrated in FIG. 8 wherein components 55, 56, 57 and 58 engage each other so that in each connection a specially formed edge configuration having an enlarged mass and a recess therein of one component mates with and is connected to a plain formed remaining portion of a second component. In the case of structurals, the elongated shapes formed by precision rolling may be blanked by merely squaring of the ends. After blanking, the components can be easily formed by known techniques to impart the desired configuration. For example, components 55 and 57, FIG. 8, are each double bent at 90° so that when joined by components 56 and 58, an I-shaped support is formed.

I claim:

1. A method of constructing hollow members comprising:

A. precision rolling wrought metal to form elongated shapes, each shape having a specially formed edge configuration including an enlarged mass having a recess therein inwardly removed from the extreme end thereof and a plain formed remaining portion, the precision-rolled shapes not requiring any further bending or forming in order to facilitate assembly thereof;

B. blanking said shapes into components:

C. positioning at least two components so that the plain formed end configuration of each component cooperates with the recess along the enlarged mass of the specially formed edge configuration of another component, said cooperation being direct and continuous and each adjacent cooperation occurring on opposite sides of the member; and D. joining said components to form a hollow member.

2. The method of claim 1 including positioning the components so that adjacent connections of components occur on opposite sides of the member.

3. The method of claim 1 wherein the blanking includes stamping a trapezoidally shaped component, the resultant member after positioning and joining being tapered.

4. The method of claim 1 including positioning two components so that the plain formed remaining portion of the first component forms a first cooperation with the specially formed edge configuration of the second component and the plain formed remaining portion of the second component forms a second cooperation with the specially formed edge configuration of the first component on an opposing side of the member from the first cooperation.

5. The method of claim 1 wherein the forming includes bending two components to form outwardly flared sections, one flared section of one component including the specially formed edge configuration and the other flared section of the other component including the plain formed remaining portion and positioning the two components so that a special formed edge configuration cooperates with a plain formed remaining portion and the flared sections are oppositely directed and positioning a third component having a specially formed edge configuration and plain formed remaining portion in cooperation with the flared sections to form a base therebetween.

6. The method of claim 4 including inserting a mid chord supporting rib between the components and joining it thereto.

7. The method of claim 4 including filling said hollow portion of the member with a material less dense than the wrought metal.

* * * * *